H. V. FENGLER.
TYPE WRITING MACHINE.
APPLICATION FILED JUNE 24, 1914.
1,244,969.
Patented Oct. 30, 1917.
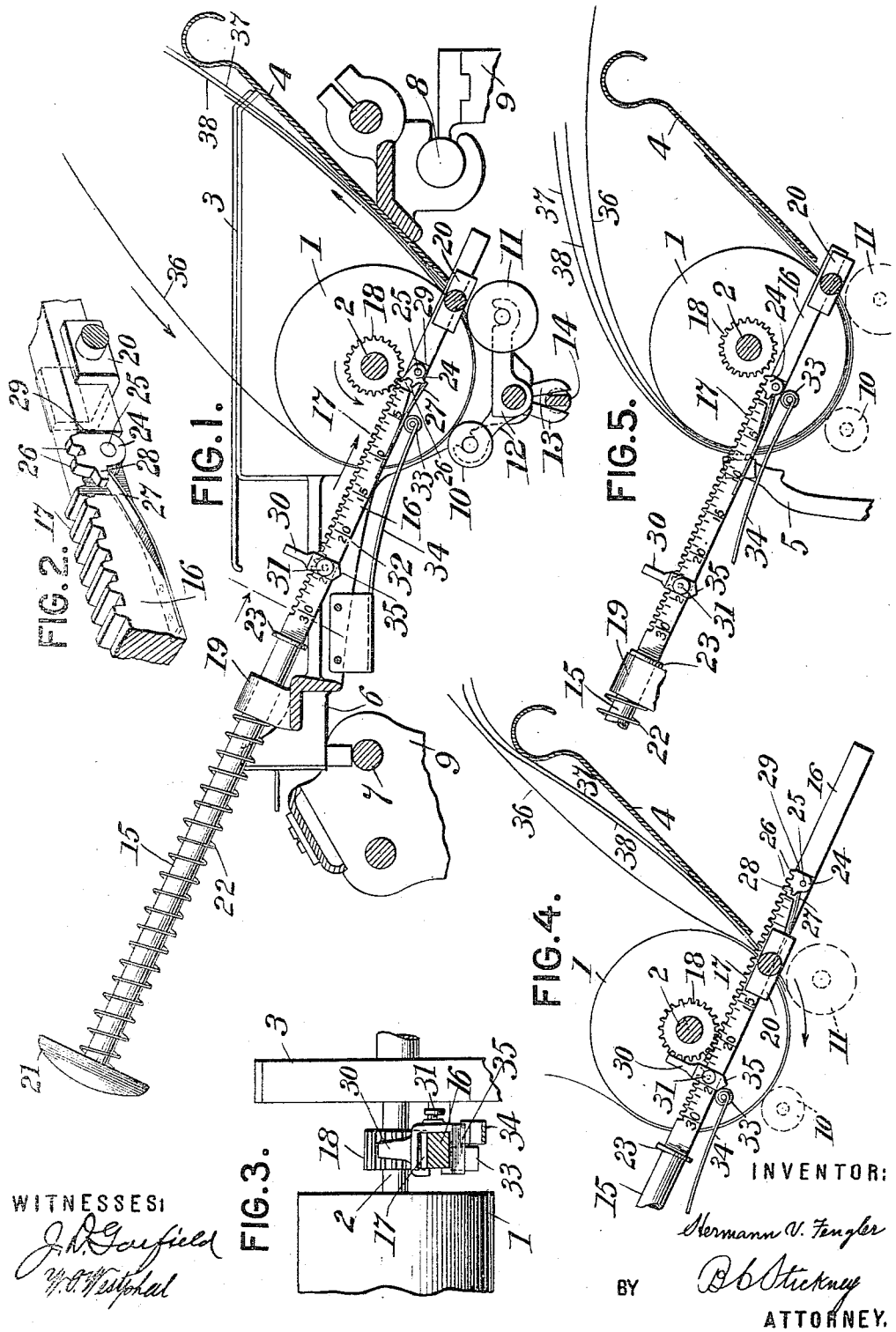
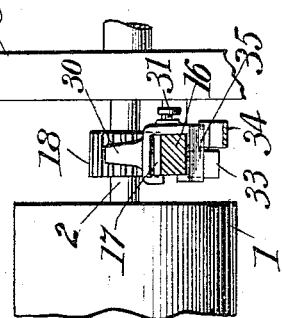
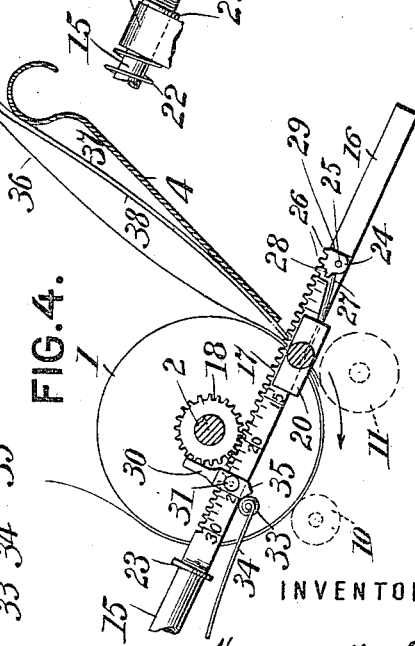
WITNESSES:
J. D. Garfield
W. O. Westphal
INVENTOR:
Hermann V. Fengler
BY D. L. Stickney
ATTORNEY.

UNITED STATES PATENT OFFICE.

HERMANN V. FENGLER, OF WEST PHILADELPHIA, PENNSYLVANIA, ASSIGNOR TO UNDERWOOD TYPEWRITER COMPANY, OF NEW YORK, N. Y., A CORPORATION OF DELAWARE.

TYPE-WRITING MACHINE.

1,244,969.      Specification of Letters Patent.      Patented Oct. 30, 1917.

Application filed June 24, 1914. Serial No. 846,934.

*To all whom it may concern:*

Be it known that I, HERMANN V. FENGLER, a citizen of the United States, residing in West Philadelphia, in the county of Philadelphia and State of Pennsylvania, have invented certain new and useful Improvements in Type-Writing Machines, of which the following is a specification.

This invention relates to billing machines adapted for making typewritten entries on a series of bills or other work-sheets placed on the machine *seriatim*, a single long ledger sheet or other record sheet being used to receive successively the record copies of the entries of several bills.

When the typewritten entries on a bill have been completed, the platen is rotated backward to bring the platen into position to receive the succeeding bill, which is then placed on the machine, and the platen rotated forward to bring the new bill into position to be written upon.

An object of the present invention is to provide an improved means for thus rotating the platen. In carrying out the invention, a driver for rotating the platen backward and forward may be provided in the form of a rack, mounted to reciprocate on the platen frame and meshing with a pinion connected to the platen. The rack as it advances rotates the platen backward, which rotation may be limited by a stop adjustable along the rack, and said stop may also form a gage coöperating with a graduated scale on the rack to indicate the number of line space distances the platen may be rotated by the rack for any adjustment of the gage. Said rack comprises in addition to the main portion which drives the platen in both directions, an additional section operable only to drive the platen in a forward direction.

As the record sheet moves with the platen during both its backward and forward rotation, the forward rotation must be through a somewhat greater angle than the backward rotation in order to provide a suitable space between the entries on the record sheet. Said rack section may accordingly comprise a member pivoted at the end of the main rack and provided with one or more rack teeth in line with the main rack, said member swinging about its pivot to an inoperative position when the driver is advanced to rotate the platen backward, but being held in an operative position when the driver is returned, so that the forward rotation of the platen by the driver is through a greater angle than the backward rotation, thereby suitably spacing the entries on the record sheet. The driver may be held in its normal inoperative position by a spring, and may also be held in its forward position by a spring detent coöperating with the adjustable gage so that the driver is held in an advanced position determined by the adjustment of the gage.

Certain of the improvements are not limited to use in connection with straight racks, and the term "racks" is intended to include both straight and curved racks or gears.

Other features and advantages will hereinafter appear; and portions of the invention are usable for other purposes.

In the accompanying drawing,

Figure 1 is a sectional elevation view of an Underwood typewriting machine with the present invention applied thereto, the platen driver being advanced a short distance from its normal position of rest.

Fig. 2 is a fragmentary view of the driving rack.

Fig. 3 is a fragmentary sectional view as indicated by the sectional line 3—3 on Fig. 1.

Fig. 4 is a sectional view showing the driver in its advanced position.

Fig. 5 is a similar view showing the driver in its normal position of rest.

A roller platen 1 is fixed to an axle 2 journaled in the ends 3 of the platen frame, which also comprises an inclined paper shelf 4 at the rear of the platen. Type bars 5 are operated in the usual way and swing upwardly and rearwardly against the front face of the platen. The platen frame is mounted on a carriage 6, which may be driven by a spring motor (not shown) and travels on front and rear guide rails 7, 8 on the machine frame 9. Front and rear feed rolls 10 and 11 are spring held against the under face of the platen, said rolls supported on levers 12, having arms 13, which may be operated by the usual key actuated cam shaft 14 for lifting the feed rolls from the platen. The above parts may be the same as those in common use on the commercial Underwood machine.

When the machine is used as a billing machine, the platen is rotated backward and forward for removing the completed bills and placing new bills on the machine by means of a driver 15 comprising a rack bar 16, formed with rack teeth 17, to mesh with a pinion 18 fixed to the platen axle 2. The driver 15 is slidably mounted and supported in bearing lugs 19 and 20 on the platen frame. A handle 21 is provided for operating the driver and said driver may be returned to its normal position of rest and held in said position by a coil spring 22 mounted on the driver between the lug 19 and handle 21. A shoulder 23 on the driver is brought against the bearing lug 19 to limit the return movement of the driver. The driving rack comprise an auxiliary one-way driving member 24 connected by a pivot 25 to the rack bar and provided with one or more teeth 26 in alinement with the rack teeth 17 so as to form a virtual continuation of the main driving rack. The member 24 is normally held in operative position by a leaf spring 27, which engages beneath a lug 28 on the member 24 and holds the latter against a shoulder 29 on the rack bar.

When the driver 15 is advanced from its normal position, shown in Fig. 5, the member 24 is suppressed by striking the pinion 18 and swinging back to the Fig. 1 position so as to pass said pinion without rotating it. The rack teeth 17 then engage the pinion and rotate the platen backward until the driver is arrested by a stop 30 being brought against the pinion 18, as shown in Fig. 4. Said stop is adjustable along the rack bar 16 and held in adjusted position by a set-screw 31. The stop 30 forms a gage coöperating with a graduated scale 32, on the driver, which scale indicates the number of line spaces through which the platen may be rotated backward by the driver. The rack teeth and scale graduations are preferably equally spaced, the spacing of the rack teeth preferably corresponding to the line space rotations of the platen; that is, each rack tooth rotates the platen the distance between two consecutive lines of writing, such distance determined by the usual line-space mechanism, not shown.

When the driver 15 reaches the limit of its forward movement, that is, when the gage 30 strikes the gear wheel 18, it is held in such position by a detent 33 on a spring arm 34, said detent engaging behind an inclined shoulder 35 on the gage 30. The spring 34 holds the detent with sufficient power to prevent its release by the spring 22; but is readily released by a pull on the handle 21. The tension of the spring 22 may be insufficient to rotate the platen, but serves to hold the driver 15 in its initial position. During the advance of the driver, the auxiliary rack 24, after passing the pinion 18, is thrown back to normal position Fig. 4, by the spring 27, so that when the driver is returned to drive the platen forward, the teeth 26 impart an additional forward rotation to the platen after the rack teeth 17 have returned the platen to the position occupied before the operation of the driver.

In use, a ledger sheet 36 or other record sheet may be placed on the platen together with a bill 37 or other work piece and a carbon sheet 38 placed between the said bill and record sheet. The driver 15 is in its advanced position, Fig. 4, when the bill 37 is placed on the machine. Said bill is placed on the paper shelf 4 and dropped down with its leading edge in position to be gripped between the platen and the pressure roll 11. The driver is now returned to its initial position Fig. 5, and during its return movement the rack teeth 17 and 26 rotate the platen and advance the bill 37 into position to receive the first line of writing.

After the typewritten matter has been entered on the bill, (during which operation the platen may be rotated by the usual line-space mechanism if more than one line is written on the bill) the platen is returned by means of the driver 15 until arrested by the stop 30, after which the completed bill is removed and a new bill placed on the machine while the driver is held by the detent 33. It will be understood that in removing the bill after the driver has been brought to the Fig. 4 position, the platen is not rotated further, being locked against further backward rotation by the rack bar and the stop 30. Ordinarily the bill at this time is held only by the rear pressure rolls 11 and may be easily pulled out without rotating the platen, or disturbing the record and carbon sheets. As the record sheet 36 is moved with the platen, it will be seen that in advancing the new bill or work sheet to writing position, the record sheet is advanced a greater distance than it was moved backward in removing the preceding bill, this distance being a number of line spaces equal to the number of teeth 26, thereby spacing the entries on the record sheet by this amount.

The gage 30 may be set for any series of bills or other work forms by adjusting it to the scale graduation representing the number of line spaces from the upper edge of the bill to the first writing line, or if this is not known, by placing the bill on the machine and feeding it forward into position for receiving the first line of writing, then rotating the platen backwardly by means of the driver to a point at which the bill is freed from the pressure rolls 11, then forwardly two scale graduations to compensate for the teeth 26, and finally setting the gage 30 up to the pinion 18.

Although in the specific form of the invention illustrated, a straight reciprocating rack bar 16 is shown and described, it will be understood that the invention comprehends the use of a driver in which the rack is in the form of an oscillating segment or a gear wheel.

Variations may be resorted to within the scope of the invention, and portions of the improvements may be used without others.

Having thus described my invention, I claim:

1. The combination with a platen and a pinion connected to rotate the platen in the same direction as the pinion rotates, of a driver having a forward and rearward reciprocating movement for rotating the platen in both directions, said driver comprising a rack to engage the pinion below its axis and thereby cause the platen to rotate backwardly as the driver is moved rearwardly and to rotate forwardly as the driver moves forwardly, said rack having a section positively held in position to drive said pinion during both the advance and return movements of the rack, and a section free to move out of driving position and remain inoperative during the movement of the rack in one direction and to positively engage and drive said pinion during the movement of the rack in the reverse direction.

2. The combination with a platen, of a pinion connected to drive the platen, a driver having a straight-line reciprocating movement and comprising a reciprocating rack to drive the pinion during both the advance and return of the driver, and a section pivoted to the driver and having a tooth or teeth in alinement with the rack teeth of said reciprocating rack, said section yieldingly held in operative position whereby it may be swung about its pivot to an inoperative position to prevent intermeshing of its teeth with those of the pinion when struck by the pinion during the movement of the driver in one direction, a stop to hold said section in operative position during the movement of the driver in the opposite direction, the driver extending forwardly beyond the platen frame and comprising an operating handle at its forward end, and means to hold the driver in its forward position with the rack in front of the platen and disconnected from the pinion to permit the platen to rotate independently of the driver.

3. The combination with a platen, of a pinion connected to drive the platen, a driver comprising a rack to engage said pinion and rotate the platen backwardly during the advance movement of the driver to carry a bill or other work-sheet into position to be removed from the machine, a stop on the driver and adjustable therealong to limit the advance movement of the driver, a spring detent to hold the driver in its advanced position determined by the position of the stop along the driver, and a spring to return the driver and cause the rack to rotate the platen forwardly during the return of the driver.

4. The combination with a platen, of a pinion connected to drive the platen, a driver comprising a rack to engage said pinion and rotate the platen backwardly during the advance movement of the driver to carry a bill or other work-sheet into position to be removed from the machine, a stop on the driver and adjustable therealong to limit the advance movement of the driver, a spring detent to hold the driver in its advanced position determined by the position of the stop along the driver, a spring to return the driver and cause the rack to rotate the platen forwardly during the return of the driver, and means operated by the driver and coöperating with said rack to rotate the platen in a forward direction a greater distance than it is rotated backwardly by the driver.

5. The combination with a platen frame and a platen thereon, of a pinion connected to drive the platen, a reciprocating driver mounted on the platen frame and comprising a rack to engage said pinion and rotate the platen backwardly and forwardly during the advance and return of the driver, said rack being normally held in a position beyond the said pinion, whereby the platen may be rotated independently of the driver, a spring to return the driver and hold it in its normal position, a stop to limit the return movement of the driver, and a spring detent to hold the driver in its advanced position against the tension of said returning spring, and manually releasable by power applied to the driver in the direction of its return movement.

6. The combination with a platen frame and a platen thereon, of a pinion co-axial with the platen and connected to drive the platen, a driver mounted on the platen frame for rearward and forward reciprocating movement, and comprising a rack to engage the under side of said pinion and thereby rotate the platen backwardly and forwardly during the rearward and forward movements respectively of the driver, said rack being normally held in a position beyond the said pinion, whereby the platen may be rotated independently of the driver, and a stop adjustable along the rack to engage the said pinion and thereby limit the rearward movement of the driver and positively limit the backward rotation of the platen.

7. The combination with a platen frame and a platen thereon, of a pinion connected to drive the platen, a reciprocating driver mounted on the platen frame and comprising a rack to engage said pinion and rotate the platen backwardly and forwardly during the advance and return of the driver, said rack being normally held in a position beyond the said pinion, whereby the platen may be rotated independently of the driver, a stop adjustable along the rack to determine the advanced position of the driver, and a spring detent to yieldingly engage said stop and thereby hold the driver in the position determined by the adjustment of said stop, said detent releasable from the stop by power applied to the driver in a direction to return the driver.

8. In a billing machine, the combination with a platen frame and a platen having its axle journaled in said frame, of a pinion to rotate the platen, a platen driver comprising a reciprocating rod journaled in the platen frame and a rack bar having rack teeth to engage said pinion and thereby rotate the platen as the driver is advanced, a pivoted section at the end of the said rack comprising teeth normally in alinement with the teeth of the rack, a spring to hold said section in its operative position, a stop adjustable along the rack, and a detent to engage said stop and thereby hold the driver in its advanced position, the driver being normally in a position with the rack teeth beyond the pinion, whereby the platen may be rotated independently of the driver, said pivoted section movable to inoperative position as the driver is advanced, and held in operative position to drive the platen during the return of the driver, whereby the platen is rotated in a forward direction by the driver a greater distance than it is rotated backwardly during the advance of the driver.

9. In a billing machine, the combination with a platen frame and a platen having its axle journaled in said frame, of a pinion secured to the platen axle, a platen driver comprising a reciprocating rod journaled in the platen frame and extending forwardly in front of the platen, and also comprising a main rack bar having rack teeth to engage the under side of said pinion and thereby rotate the platen backwardly as the driver is advanced, a pivoted section at the end of the said main rack comprising teeth normally in alinement with the teeth of the main rack, and a spring to hold said section in its operative position, said pivoted section movable downwardly to inoperative position as the driver is advanced, and held in operative position to drive the platen during the return of the driver, whereby the platen is rotated in a forward direction by the driver, a greater distance than it is rotated backwardly during the advance of the driver.

10. In a billing machine, the combination with a platen frame and a platen having its axle journaled in said frame, of a pinion secured to the platen axle, a platen driver comprising a reciprocating rod journaled in the platen frame and extending forwardly in front of the platen, and also comprising a main rack bar having rack teeth to engage the under side of said pinion and thereby rotate the platen backwardly as the driver is advanced, a pivoted section at the end of the said main rack comprising teeth normally in alinement with the teeth of the main rack, a spring to hold said section in its operative position, a gage adjustable along the rack, a graduated scale on the rack to indicate the number of line spaces through which the platen may be rotated by the driver for any position of adjustment of the gage, a spring detent to engage said gage and thereby hold the driver in its advanced position, a stop to limit the return movement of the driver, and a spring to hold the driver in its normal position with the rack teeth beyond the pinion, whereby the platen may be rotated independently of the driver; said pivoted section movable downwardly to inoperative position as the driver is advanced and held in operative position to drive the platen during the return of the driver, whereby the platen is rotated in a forward direction by the driver a greater distance than it is rotated backwardly during the advance of the driver.

11. The combination with a platen frame and a platen rotatably mounted thereon, of a driver for rotating the platen in both directions, said driver comprising a rod extending forwardly from the platen frame and provided at its forward end with a handle for operating the driver, bearings on the frame in which the driver is mounted for bodily reciprocating movement, a pinion mounted on the platen axle and having a fixed connection with the platen, said driver comprising a rack running in mesh with the under side of said piston to drive it, and rotate the platen backwardly as the driver moves rearwardly and rotate the platen forwardly as the driver moves forwardly, and means to normally hold the rack free from the pinion to permit the platen to be rotated independently of the rack.

12. The combination with a platen frame and a platen rotatably mounted thereon, of a driver for rotating the platen in both directions, said driver comprising a rod extending forwardly from the platen frame and provided at its forward end with a handle for operating the driver, bearings on the frame in which the driver is mounted for bodily reciprocating movement, a pinion mounted on the platen axle and having a fixed connection with the platen, said driver comprising a rack running in mesh with the under side of said pinion to drive it and rotate the platen backwardly as the driver moves rearwardly and rotate the platen forwardly as the driver moves forwardly, and means to normally hold the rack free from the pinion to permit the platen to be rotated independently of the rack, said driver comprising a section operable to rotate the pinion during the forward movement only of the driver, whereby the platen at each reciprocation of the driver is rotated forwardly through a greater distance than it is rotated backwardly.

13. The combination with a platen frame and a platen rotatably mounted thereon, of a pinion connected to the platen, a driver for rotating the platen through predetermined distances in both directions, the distance the platen is rotated in one direction being greater than the distance it is rotated in the opposite direction, said driver comprising a rack having a section to drive said pinion in both directions, and a one-way driving section for driving the pinion in one direction only, and bearings on the platen frame in which the driver is slidably mounted for backward and forward reciprocating movement, the rack being recessed to receive said last-mentioned section and permit the latter to move through one of said bearings as the driver is reciprocated.

14. The combination with a platen frame and a platen rotatably mounted thereon, of a pinion connected to rotate with the platen, a driver for rotating the platen comprising a forwardly and rearwardly extending rack bar, bearings on the platen frame located forwardly and rearwardly of the platen axle, in which the rack bar is slidably mounted for forward and rearward movement in the direction of its length, said rack bar comprising rack teeth to engage with said pinion and drive the platen during the forward and rearward movements of the rack bar, and a one-way driving section pivoted on the rack bar and repressible during the movement of the driver in one direction, and operable to drive the platen as the driver moves in the opposite direction, whereby the platen is rotated through a greater distance in one direction than the other, said rack bar being recessed to receive said section, so that the latter may pass through the bearing at the rear of the platen axle.

15. The combination with a platen frame and a platen rotatably mounted thereon, of a pinion connected to rotate with the platen, a driver for rotating the platen comprising a forwardly and rearwardly extending rack bar, bearings on the platen frame located forwardly and rearwardly of the platen axle, in which the rack bar is slidably mounted for forward and rearward movement in the direction of its length, said rack bar comprising rack teeth to engage with said pinion and drive the platen during the forward and rearward movements of the rack bar, and a one-way driving section pivoted on the rack bar and repressible during the movement of the driver in one direction, and operable to drive the platen as the driver moves in the opposite direction whereby the platen is rotated through a greater distance in one direction than the other, said rack bar being recessed to receive said section, so that the latter may pass through the bearing at the rear of the platen axle, said driver comprising a rod extending forwardly beyond said front bearing and provided at its forward end with a handle for reciprocating the driver, and a spring for moving said driver forwardly to a position out of driving connection with said pinion to permit the platen to be rotated independently of the driver.

16. The combination with a platen frame and a platen comprising an axle journaled in said frame, of a pinion fixed to the platen axle, bearings on the platen frame, a driver comprising a rack arranged to engage said pinion beneath the axle, said driver slidably mounted in said bearings for rearward and forward movement therein, whereby the platen is rotated backwardly as the driver is moved rearwardly and is rotated forwardly as the driver is moved forwardly, the driver comprising a section repressible during the rearward movement of the driver and operable during the forward movement of the driver to drive said pinion, whereby the forward rotation of the platen by the driver is through a greater distance than the backward rotation, a stop adjustable along the driver to limit its rearward movement, and a spring detent coöperating with said stop and brought into operation to hold the driver when the latter is at the limit of its rearward movement determined by the position of said stop, said detent releasable by power applied to return the driver, whereby the return movement of the driver is opposed by the detent at the commencement only of the return movement of the driver.

17. The combination with a platen frame and a platen comprising an axle journaled in said frame, of a pinion fixed to the platen axle, bearings on the platen frame, a driver comprising a rack arranged to engage said pinion beneath the axle, said driver slidably mounted in said bearings for rearward and forward movement therein, whereby the platen is rotated backwardly as the driver is moved rearwardly and is rotated forwardly as the driver is moved forwardly, the driver comprising a section repressible during the rearward movement of the driver and operable during the forward movement of the driver to drive said pinion, whereby the forward rotation of the platen by the driver is through a greater distance than the backward rotation, said driver comprising a rod extending forwardly beyond said bearings and provided at its forward end with an operating handle, a coil spring mounted on said rod between the handle and the platen frame, for moving the driver in a forward direction and holding said rack out of engagement with the pinion to permit the platen to rotate independently of the driver.

18. In a typewriting machine, the combination with a typewriter frame, of a platen mounted to travel and rotate relatively to said frame, a gear secured to said platen, and a hand rack bar engaging said gear on the underside to rotate said platen by an initial forward stroke, so as to remove bills therefrom, said bar normally clearing said frame at its rear end, and also projecting at its front end to enable its initial rearward driving movement.

19. The combination with a platen, of a gear secured to said platen, a driver for said gear and said platen, a spring automatically returning said driver, a detent for said driver, and an adjustable member on said driver determining the limit of initial driving movement and engaging said detent to prevent a return movement by said spring.

HERMANN V. FENGLER.

Witnesses:
J. H. BLODGETT,
WILLIAM A. HARTNETT.